United States Patent
Herzog et al.

(10) Patent No.: US 6,422,710 B1
(45) Date of Patent: Jul. 23, 2002

(54) ILLUMINATED-DISPLAY GRADUATED SCALE DEVICE

(75) Inventors: Bernhard Herzog, Stuttgart; Uwe Borsdorf, Leonberg; Christoph Jonda, Regensburg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/555,412

(22) PCT Filed: Jun. 18, 1999

(86) PCT No.: PCT/DE99/01798

§ 371 (c)(1),
(2), (4) Date: Sep. 27, 2000

(87) PCT Pub. No.: WO00/18609

PCT Pub. Date: Apr. 6, 2000

(30) Foreign Application Priority Data

Sep. 28, 1998 (DE) .......................................... 198 44 316

(51) Int. Cl.⁷ ............................................... G01D 11/28
(52) U.S. Cl. .............................. 362/23; 362/26; 362/27; 362/555
(58) Field of Search ............................. 362/23, 26, 27, 362/555, 242, 244; 116/250

(56) References Cited

U.S. PATENT DOCUMENTS 5,695,269 A * 12/1997 Lippmann et al. ............ 362/27
5,741,058 A * 4/1998 Suzuki et al. ................. 362/27
5,915,822 A * 6/1999 Ogura et al. .................. 362/26

FOREIGN PATENT DOCUMENTS

| CH | 659 321 | 1/1987 |
| DE | 195 32 427 | 11/1996 |
| DE | 195 47 375 | 6/1997 |
| WO | WO 88 03663 | 5/1988 |
| WO | WO 99 08075 | 2/1999 |

* cited by examiner

Primary Examiner—Sandra O'Shea
Assistant Examiner—Ali Alavi
(74) Attorney, Agent, or Firm—Kenyon & Kenyon

(57) ABSTRACT

A lightable indicator scale device is created, in particular, for a combination instrument in a motor vehicle, and has a dial which has a first lightable indicator scale in a first area, a second lightable indicator scale in a second area and a third lightable indicator scale in a third area; a first light source device for lighting the first lightable indicator scale and the third lightable indicator scale; a second light source device for lighting the second lightable indicator scale; and a light guide device arranged between the first and second light source devices, on the one hand, and the dial, on the other hand, designed such that it guides light beams of the first light source device to the first area and to the third area; it prevents light beams of the first light source device from reaching the second lightable indicator scale directly; it guides the light beams directed at the third area through the second area, without light scattering into the second lightable indicator scale; and it guide light beams of the second light source device to the second area without light scattering into the first and third lightable indicator scales.

14 Claims, 3 Drawing Sheets

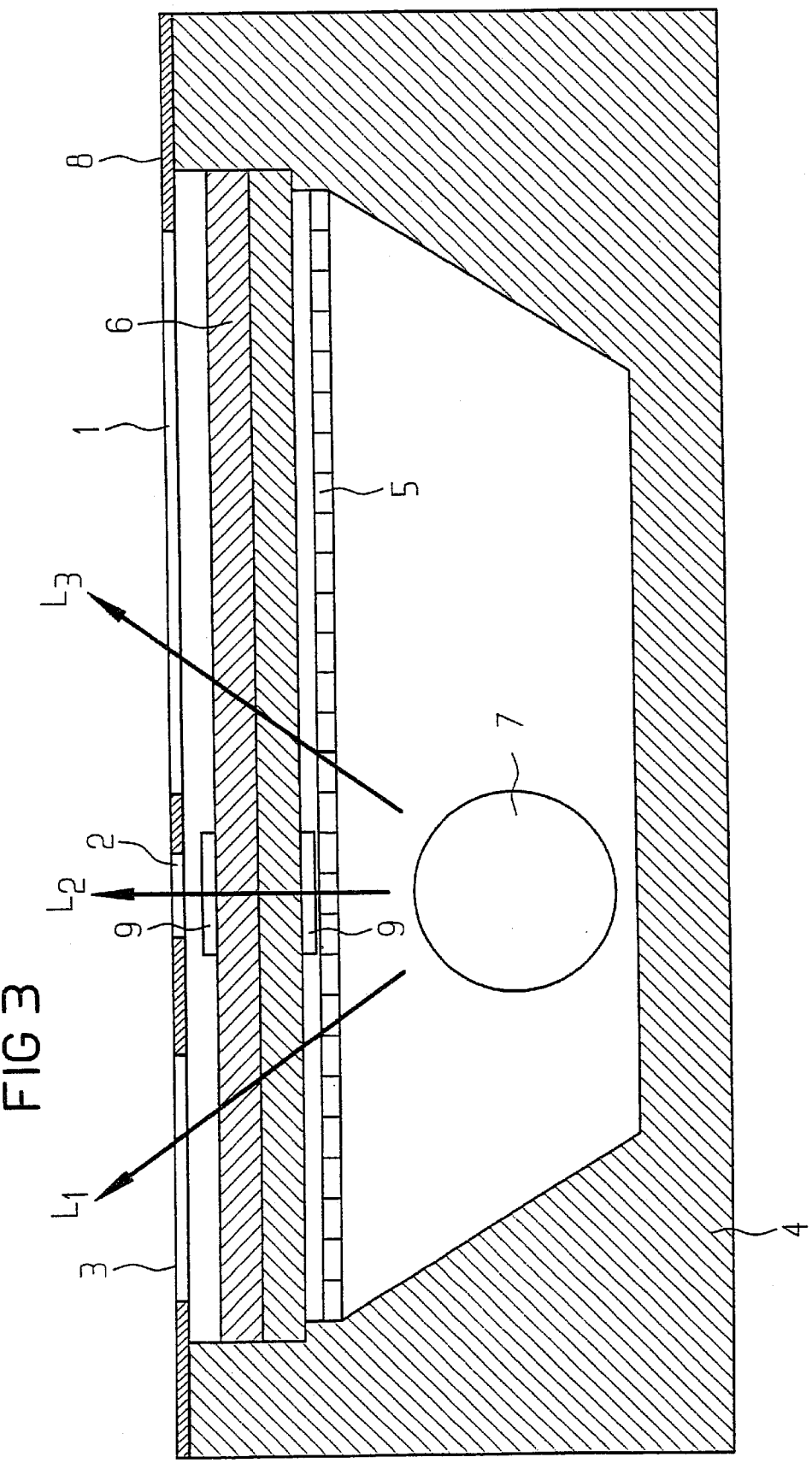

ILLUMINATED-DISPLAY GRADUATED SCALE DEVICE

FIELD OF THE INVENTION

The present invention relates to a lightable indicator scale device, and, in particular, a lightable indicator scale device for a combination instrument in a motor vehicle, having a dial which has a first lightable indicator scale in a first area, a second lightable indicator scale in a second area and a third lightable indicator scale in a third area.

BACKGROUND INFORMATION

FIG. 2 shows a top view of a conventional lightable indicator scale device for a combination instrument in a motor vehicle, and FIG. 3 shows a cross-sectional view of the conventional lightable indicator scale device illustrated in FIG. 2.

FIGS. 2 and 3 show a first lightable indicator scale 1 in the form of a km/h scale, a second lightable indicator scale 2 in the form of a cruise control scale, a third lightable indicator scale 3 in the form of an mph scale, beams of light $L_1$–$L_3$, a system carrier 4, a luminous disk or diffusing panel 5, a liquid crystal display 6, a cold cathode fluorescent lamp 7, a dial 8 and a polarization filter 9.

With the lighting for the two concentrically arranged indicator scales 1 and 3 in the combination instrument with cold cathode fluorescent lamp 7, the cruise control segments between these two scales must be selectively switchable between lighted and unlighted.

Guarantee this, German Patent Application 195 47 375 A1 describes that all three indicator scale 1, 2, 3 can be lighted with a single light source 7 as illustrated in FIG. 3. In system carrier 4, which simultaneously functions as a reflector, cold cathode fluorescent lamp 7 is located beneath luminous disk 5 with liquid crystal display 6 above it, the latter being controllable locally in the area of the cruise control scale. The cold cathode fluorescent lamp 7 lights up all three indicator scales 1, 2 and 3, as illustrated by beams of light $L_1$, $L_2$ and $L_3$ passing through corresponding transparent or translucent passages in dial 8 to the observer.

Two polarization filters 9 are arranged in the area of cruise control scale 2. They are crossed so that no beam of light $L_2$ passes through cruise control scale 2 to the observer when liquid crystal display 6 is not activated, so that cruise control scale 2 appears dark in the respective indicator segment.

Selective activation of individual areas of liquid crystal display 6 corresponding to the cruise control indicator segments makes it possible for incident beam of light $L_2$ to undergo a change in its polarization in the area of liquid crystal display 6 and thus be able to pass through crossed polarization filters 9, so cruise control scale 2 appears bright in the respective indicator segment.

A disadvantage of the above described lightable indicator scale device is that the shape of liquid crystal display 6 must be adapted to that of cruise control scale 2 (a horseshoe shape in the example illustrated here) and therefore this display is complicated, sensitive and expensive to manufacture, and both installation and removal are complicated.

SUMMARY OF THE INVENTION

A lightable indicator scale device according to the present invention has an advantage in that expensive liquid crystal displays which have complicated shapes, such as semicircles, can be eliminated for light control of the cruise control indicator segments and can be replaced by a simple independent second light source device which is expediently provided only for the cruise control scale. For example, LEDs (light emitting diodes) employing a simpler and less expensive control concept in comparison with a liquid crystal display may be used for this purpose.

The present invention contemplates that a light guide device is provided between the first and second light source devices, on the one hand, and the dial, on the other hand, to split the light of the first light source device, i.e., the cold cathode fluorescent lamp, into the first and third areas, which are separated by the dark second area which is free of scattering. This second area corresponding to the second indicator scale can be used for displaying information with the second light source device which is separated from the first light source device.

In one embodiment, the second lightable indicator scale is arranged between the first lightable indicator scale and the third lightable indicator scale, and all three indicator scales are substantially concentric.

In another embodiment, the first light source device is a cold cathode fluorescent lamp.

In another embodiment, the second light source device is an LED arrangement, which can be controlled easily to selectively light indicator segments of the second indicator scale.

In another embodiment, the first lightable indicator scale is arranged substantially in front of the first light source device, and the third lightable indicator scale is offset to the side from the former.

In another embodiment, the first light source device is toroidal, the axis of the cylinder arranged substantially normal to the viewing direction, and the light guide device adjacent to the first light source device has a corresponding semicircular first cutout adjacent to the first light source device. This symmetry permits a relatively simple design of the light guide device.

In another embodiment, the light guide device has a triangular second cutout adjacent to the dial. The light guide has an edge which prevents beams of light from the first light source device from reaching the second indicator scale directly.

In another embodiment, the light guide device has substantially plane-parallel surfaces in the second area. This prevents input of light from the first light source device into the second indicator scale, on the one hand, while, on the other hand, preventing input of light from the second light source device into the first or third indicator scale.

In another embodiment, the light guide device has a chamfered area in the third area for output of beams of light for lighting the third lightable indicator scale. This area, which is preferably stepped, ensures complete output of light at this point into the third indicator scale.

In another embodiment, a system carrier is provided to hold the dial and the light guide device.

In another embodiment, the system carrier functions as a reflector for the first light source device in the first area.

In another embodiment, the system carrier has a lighting well for the second light source device in the second area. It is possible to obtain from the second light source device a directional or collimated light beam traversing the light guide device essentially in a straight line to reach the second indicator scale, i.e., the respective indicator segment of the cruise control scale.

In another embodiment, the light guide device has a surface which is inclined so that incident beams are either allowed to pass through to the first indicator scale or are deflected by total reflection such that they undergo total reflection again in the second area and thus do not light the second indicator scale.

BRIEF DESCRIPTION OF THE DRAWINGS

FIG. 3 shows a cross section of the conventional lightable indicator scale device illustrated in FIG. 2.

DETAILED DESCRIPTION

Although it can be applied to any lightable indicator scale device, the present invention and an object of the present invention will be explained with reference to a combination instrument on board a motor vehicle.

Figure 1:
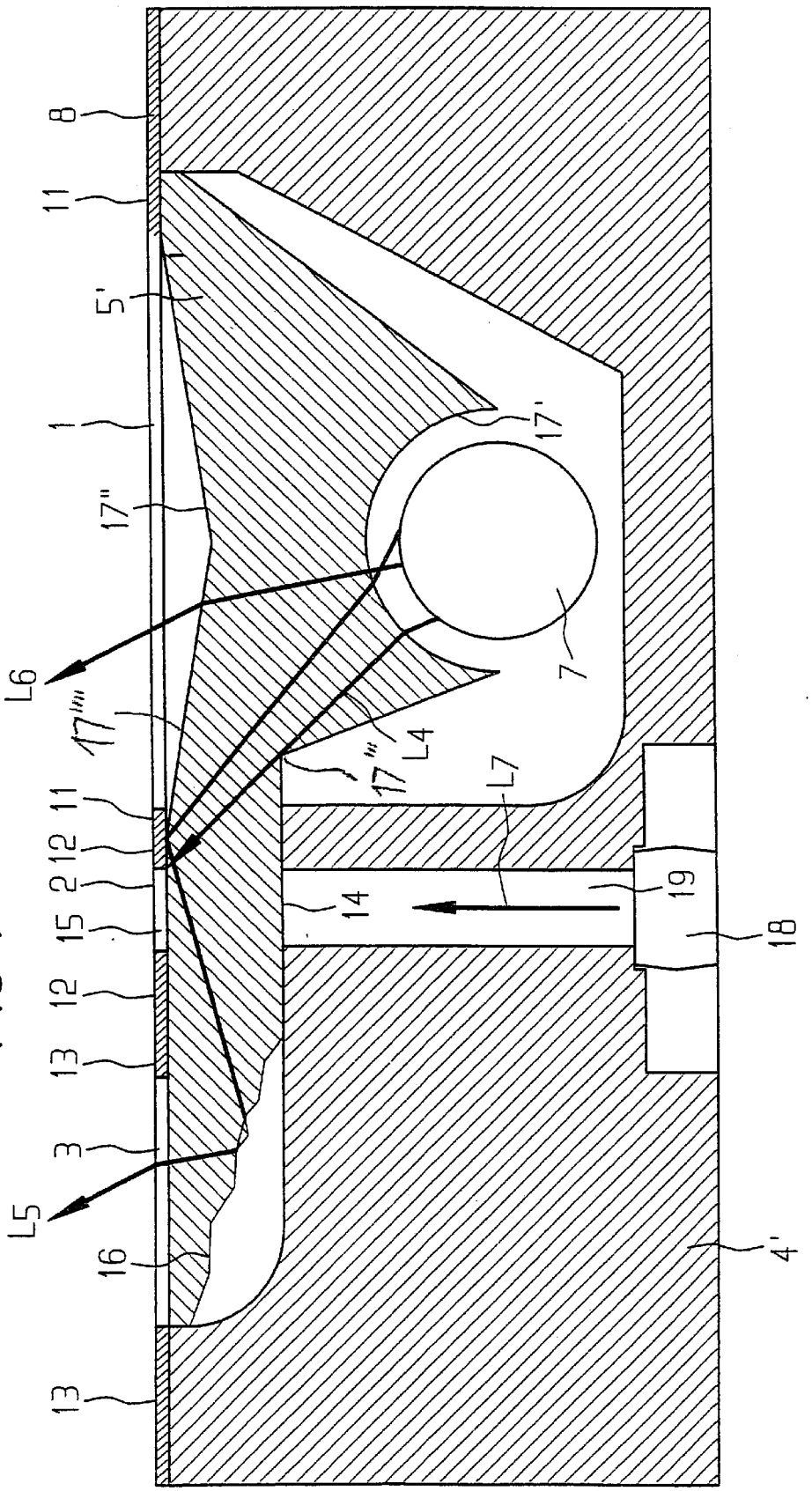
FIG. 1 shows a cross section of an embodiment of a lightable indicator scale device according to the present invention.
Figure 2:
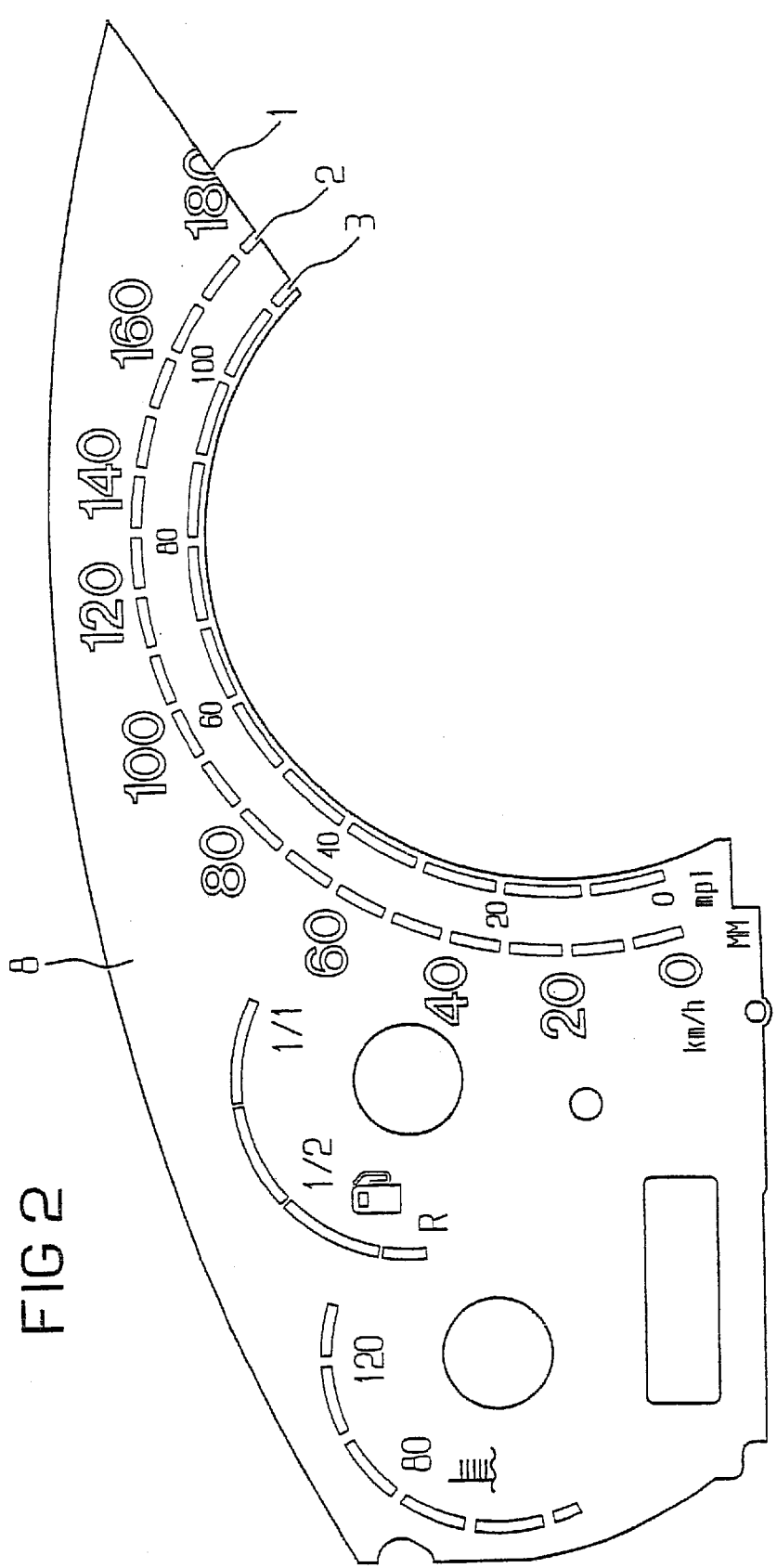
FIG. 2 shows a top view of a conventional lightable indicator scale device for a combination instrument in a motor vehicle.

FIG. 1 shows a cross section of an embodiment of a lightable indicator scale device according to the present invention.

In addition to the reference numbers already introduced, FIG. 1 shows a modified system carrier 4', a light guide device 5' instead of diffusing panel 5, a first, second and third area 11, 12, 13 corresponding to first through third indicator scales 1 through 3, plane-parallel surfaces 14, 15 of light guide device 5' in second area 12, a chamfered area 16 of light guide device 5' in third area 13, a first semicircular cutout 17' of light guide device 5' in first area 11, a second triangular cutout 17'' of light guide device 5' in first area 11, an edge-shaped cutout 17''' of light guide device 5' in first area 11, an inclined surface 17'''', an LED arrangement 18 and a lighting well 19. The design and functioning of the lightable indicator scale device according to the embodiment shown here for a combination instrument in a motor vehicle are explained in greater detail below.

Dial 8 which has first lightable indicator scale 1 as a km/h scale in first area 11, second lightable indicator scale 2 as a cruise control scale in second area 12 and third lightable indicator scale 3 as an mph scale in third area 13 has substantially the same design as that of the conventional lightable indicator scale device illustrated in FIG. 3 as explained above. Thus, second lightable indicator scale 2 is again arranged between first lightable indicator scale 1 and third lightable indicator scale 3, and all three indicator scales 1, 2, 3 are substantially concentric.

Modified system carrier 4' functions in general to hold dial 8 and light guide device 5' and specifically as a reflector for first light source device 7 in first area 11.

By combining modified system carrier 4', which functions as a reflector in first area 11 at the same time, and the specially shaped luminous disk, i.e., light guide device 5', the beams of light of the first light source device in the form of cold cathode fluorescent lamp 7 are split into two areas 11, 13 having a high luminance, separated by area 12 having a low luminance.

In this example, second light source device 18 is an LED arrangement which can selectively light only the cruise control indicator segments.

Light guide device 5' arranged between first and second light source devices 7, 18, on the one hand, and dial 8, on the other hand, is designed such that it guides light beams $L_6$ of first light source device 7 to first area 11 and light beams $L_5$ of first light source device 7 to third area 13 by using a specific design and arrangement as well as a skillful utilization of the laws of refraction of light guide device 5' which is made of commercially available plexiglass, for example.

Light beams $L_5$ directed at third area 13 are guided through second area 12 without resulting in light scattering into second lightable indicator scale 2. Only light beams $L_7$ of second light source device 18 are guided to second area 12 in second lightable indicator scale 2, and specifically without light scattering into the first and third lightable indicator scales 1, 3.

The specific embodiment of light guide device 5', its positioning on system carrier 4' and the position of dial 8 on light guide device 5 and system carrier 4' can be seen in FIG. 1.

First lightable indicator scale 1 is arranged substantially in front of or above first light source device 7, i.e., in the extension of the viewing direction of an observer from above, and third lightable indicator scale 3 is offset to the side relative to first light source device 7.

The transparent cruise control indicator segments in the second indicator scale on dial 8 are located exactly above lighting wells 19 in system carrier 4'. To prevent the scattering of light from first light source device 7 into the cruise control indicator segments, the light guide device has two plane-parallel surfaces 14, 15 in second area 12. The light is guided without scattering through the area of the cruise control indicator segments in the parallel area of the luminous disk.

First light source device 7 is toroidal, the axis of the cylinder arranged substantially normal to the viewing direction, and light guide device 5' adjacent to first light source device 7 has a corresponding first semicircular cutout 17' adjacent to first light source device 7. First semicircular cutout 17' on the bottom of light guide device 5' weakens the luminance directly above the first light source device and deflects the light into the side areas of light guide device 5'.

Light guide device 5' is structured so that no beams of light of first light source device 7 can light the cruise control indicator segments directly. Light beam $L_4$ is a limiting case where incident light at the critical angle of total reflection no longer reaches the cruise control indicator segments directly.

Light guide device 5' has a second, triangular cutout 17'' adjacent to dial 8. All beams of light striking the upper interface of light guide device 5' at a greater angle there undergo total reflection due to the chamfered shape, so that they can be output from the light guide device only in the area of third indicator scale 3; this light guide device is located above the stepped structure of chamfered area 16 which functions to output beam of light $L_5$ into third indicator scale 3 at this point.

Beams of light $L_6$ striking the upper interface of the luminous disk at a smaller angle are output in the area of first indicator scale 1. The light guide has an edge 17''' which prevents beams of light from the first light source device from reaching the second indicator scale directly.

Light guide device 5' has surface 17'''' which is inclined so that incident beams $L_6$ are either allowed to pass through to first indicator scale 1 or are deflected by total reflection so that they undergo total reflection $L_5$ again in second area 12 and thus do not light second indicator scale 2.

The cruise control segments are lighted with the LEDs of LED arrangement 18 which are placed beneath lighting wells 19. The plane-parallel structure of light guide device 5' in this area prevents the LED light from being scattered next to the cruise control indicator segments, so it cannot contribute toward lighting of the same. In addition, this gives a high contrast between lighted and unlighted indicator segments, because no light can be scattered into adjacent indicator segments.

The indicator segments of the cruise control can be lighted selectively with the LEDs, where first and third indicator scales 1, 3 can be lighted at the same time over the entire area by cold cathode fluorescent lamp 7 without interferring reflections.

Although the present invention is described above on the basis of an exemplary embodiment, it is not limited to this embodiment but instead can be modified in a variety of ways.

In particular, the division of the dial and the shape of the scales are not limited to the examples illustrated here and can be designed in many different ways without departing from the scope of the present invention.

What is claimed is:

1. A lightable indicator scale device, comprising:
   a dial including a first lightable indicator scale in a firs area, a second lightable indicator scale in a second area and a third lightable indicator scale in a third area;
   a first light source device lighting the first lightable indicator scale and the third lightable indicator scale;
   a second light source device lighting the second lightable indicator scale; and
   a light guide device arranged between the first light source device and the dial and between the second light source device and the dial,
   wherein the light guide device guides light beams of the first light source device to the first area and to the third area,
   wherein the light guide device prevents the light beams of the first light source device from reaching the second lightable indicator scale directly,
   wherein the light guide device guides the light beams of the first light source device directed at the third area through the second area without light scattering into the second lightable indicator scale, and
   wherein the light guide device guides light beams of the second light source device to the second area without light scattering into the first lightable indicator scale and the third lightable indicator scale.

2. The lightable indicator scale device according to claim 1, wherein the lightable indicator scale device is used for a combination instrument in a motor vehicle.

3. The lightable indicator scale device according to claim 1,
   wherein the second lightable indicator scale is arranged between the first lightable indicator scale and the third lightable indicator scale, and
   wherein the first lightable indicator scale, the second lightable indicator scale and the third lightable indicator scale are substantially concentric.

4. The lightable indicator scale device according to claim 1, wherein the first light source device includes a cold cathode fluorescent lamp.

5. The lightable indicator scale device according to claim 1, wherein the second light source device includes a light-emitting-diode (LED) arrangement.

6. The lightable indicator scale device according to claim 1,
   wherein the first lightable indicator scale is arranged substantially in front of the first light source device, and
   wherein the third lightable indicator scale is offset from being arranged substantially in front of the first light source device.

7. The lightable indicator scale device according to claim 6,
   wherein the first light source device is a toroid, a longitudinal axis of the toroid being arranged substantially normal to a viewing direction, and
   wherein the light guide device includes a convex cutout proximate to the first light source device.

8. The lightable indicator scale device according to claim 7, wherein the light guide device prevents, via an edge, the light beams of the first light source device from reaching the second lightable indicator scale directly.

9. The lightable indicator scale device according to claim 1, wherein the light guide device includes substantially parallel-plane surfaces in the second area.

10. The lightable indicator scale device according to claim 1, wherein the light guide device includes a chamfered area in the third area, the chamfered area outputting the light beams of the first light source device, the outputted light beams lighting the third lightable indicator scale.

11. The lightable indicator scale device according to claim 1, further comprising:
    a system carrier holding the dial and the light guide device.

12. The lightable indicator scale device according to claim 11, wherein the system carrier reflects the light beams of the first light source device in the first area.

13. The lightable indicator scale device according to claim 11, wherein the system carrier includes a lighting well for the second light source device in the second area.

14. The lightable indicator scale device according to claim 11, wherein the light guide device includes a surface that is inclined so that incident light beams are at least one of (1) allowed to pass through to the first indicator scale and (2) deflected via total reflection such that the incident light beams undergo total reflection in the second area and do not light the second lightable indicator scale.

* * * * *